US008150361B2

(12) United States Patent
Hallivuori et al.

(10) Patent No.: US 8,150,361 B2
(45) Date of Patent: *Apr. 3, 2012

(54) SINGLE CHIP AMPLIFIER AND OSCILLATOR HAVING SIMILAR RESONANT CIRCUIT TOPOLOGY

(75) Inventors: Juha Hallivuori, Tampere (FI); Mikael Gustafsson, Porvoo (FI)

(73) Assignee: Nokia Corporation, Espoo (FI)

( * ) Notice: Subject to any disclaimer, the term of this patent is extended or adjusted under 35 U.S.C. 154(b) by 1097 days.

This patent is subject to a terminal disclaimer.

(21) Appl. No.: 12/008,289

(22) Filed: Jan. 10, 2008

(65) Prior Publication Data

US 2008/0125074 A1    May 29, 2008

Related U.S. Application Data

(63) Continuation of application No. 10/917,634, filed on Aug. 13, 2004, now Pat. No. 7,343,146.

(51) Int. Cl.
*H04B 1/28* (2006.01)
*H04B 1/18* (2006.01)

(52) U.S. Cl. ............................ 455/333; 455/285; 455/323

(58) Field of Classification Search .................. 455/285, 455/323, 333, 290, 302, 334, 339, 340, 341, 455/326

See application file for complete search history.

(56) References Cited

U.S. PATENT DOCUMENTS

| 5,060,297 | A | 10/1991 | Ma et al. ........................ 455/302 |
|---|---|---|---|
| 5,311,149 | A | 5/1994 | Wagner et al. ................. 331/1 A |
| 5,715,531 | A | 2/1998 | Liu et al. ........................ 455/307 |
| 5,852,772 | A | 12/1998 | Lampe et al. ............... 455/226.2 |
| 5,930,686 | A | 7/1999 | Devlin et al. .................... 455/84 |
| 6,229,392 | B1 * | 5/2001 | Porter et al. ............... 330/207 A |
| 6,510,313 | B1 | 1/2003 | Rapeli ............................ 455/323 |
| 6,542,724 | B1 | 4/2003 | Copeland et al. ............. 455/302 |
| 6,621,365 | B1 | 9/2003 | Hallivuori et al. ............. 331/179 |
| 6,622,009 | B1 | 9/2003 | Tolson ............................ 455/76 |
| 6,639,474 | B2 | 10/2003 | Asikainen et al. .............. 331/17 |
| 6,681,103 | B1 | 1/2004 | Rogers et al. ................. 455/302 |
| 6,683,480 | B2 * | 1/2004 | Zhang et al. ................... 327/115 |
| 6,760,579 | B1 | 7/2004 | Yokoyama et al. ........... 455/352 |
| 6,801,097 | B2 | 10/2004 | Wallace ........................ 331/179 |
| 7,095,043 | B2 | 8/2006 | Oda et al. ........................ 257/19 |
| 7,839,219 | B2 * | 11/2010 | Kuo et al. ...................... 330/301 |
| 2003/0176174 | A1 | 9/2003 | Seppinen et al. .......... 455/226.1 |

(Continued)

FOREIGN PATENT DOCUMENTS

EP    1 838 005 A1    5/2000

(Continued)

*Primary Examiner* — Sonny Trinh
(74) *Attorney, Agent, or Firm* — Harrington & Smith

(57) ABSTRACT

In one aspect this invention provides a radio frequency receiver for coupling to an antenna. The receiver includes a downconversion mixer, an amplifier having an input coupled to the antenna and an output coupled to a first input of the mixer for providing a received frequency signal to the mixer and a voltage controlled oscillator having an output coupled to a second input of the mixer for providing a mixing frequency signal to the mixer. In the preferred embodiments the components of the amplifier and the voltage controlled oscillator are arranged to exhibit a substantially identical resonant circuit topology and are implemented in the same integrated circuit. In the preferred embodiments the amplifier and the voltage controlled oscillator each include calibration circuitry coupled to a calibration signal for compensating for integrated circuit component value variations, and where a calibration signal used for the voltage controlled oscillator is used as well for the amplifier.

68 Claims, 6 Drawing Sheets

U.S. PATENT DOCUMENTS

| | | | |
|---|---|---|---|
| 2003/0199259 A1 | 10/2003 | Macedo et al. | 455/141 |
| 2003/0203742 A1 | 10/2003 | D'Souza et al. | 455/522 |
| 2004/0012454 A1 | 1/2004 | Wallace | 331/179 |
| 2004/0219893 A1 | 11/2004 | Takano et al. | 455/114.3 |
| 2006/0121871 A1 | 6/2006 | Kim | 455/313 |
| 2007/0216560 A1 | 9/2007 | Miyagi et al. | 341/144 |

FOREIGN PATENT DOCUMENTS

| | | |
|---|---|---|
| EP | 1006-669 | 6/2000 |
| JP | 57-033841 A | 2/1982 |
| JP | 59-33348 | 3/1984 |
| JP | 06-013929 A | 1/1994 |
| JP | 20044153434 A | 5/2004 |

\* cited by examiner

| FIG.3A |
|---|
| FIG.3B |

SINGLE CHIP AMPLIFIER AND OSCILLATOR HAVING SIMILAR RESONANT CIRCUIT TOPOLOGY

CROSS REFERENCE TO RELATED APPLICATIONS

This application is a continuation of U.S. patent application Ser. No. 10/917,634, filed Aug. 13, 2004, now U.S. Pat. No. 7,343,146.

TECHNICAL FIELD

These teachings generally concern radio frequency (RF) receivers and, more specifically, concern single chip RF receiver designs.

BACKGROUND

The following abbreviations are herewith defined:
BB baseband
IC integrated circuit
IF intermediate frequency
LNA low noise amplifier
LO local oscillator
PLL phase lock loop
RF radio frequency
RX receiver
VCO voltage controlled oscillator
VDD power supply voltage Presently, multi-band receivers that are implemented using ICs incorporate receiver front ends that include multiple off-chip filters. These multiple off-chip filters increase the size, complexity, power consumption and the assembly cost of multi-band transceivers and their use is generally undesirable.

It can be appreciated that those skilled in the art would desire a one-chip, multi-band receiver design. Such a one-chip multi-band receiver design would preferably not require multiple off-chip filters, including a particular filter (image rejection filter) that is typically positioned between the LNA and the frequency mixer. As is explained in commonly assigned US 2003/0176174 A1, "Method and Apparatus Providing Calibration Technique for RF Performance Tuning", Pauli Seppinen, Aarno Parssinen, Mikael Gustafsson and Mika Makitalo (incorporated by reference herein in its entirety), the image rejection filter(s) are typically required due to leakage of transmitter power into the receiver input in full duplex systems, having a simultaneous transmission and reception mode (such as 3G CDMA systems).

However, the elimination of the off-chip filter between the LNA and the mixer requires that signal filtering be accomplished by other means. If the signal filtering is not performed, or is performed incorrectly, the mixer output signal will include an undesired signal component in addition to the desired signal component. This undesired signal component can, in a worst-case scenario, totally destroy the reception of the desired signal component(s).

Further, multi-band requirements for the receiver can alter the front end in such a way that a fixed filter can no longer be implemented between the LNA and mixer. This can occur because, typically, one set of controllable front-end components are used for each frequency band of interest. Thus, those skilled in the art would also desire a front-end design that accommodates multi-band operation without the complexity associated with providing filters for each frequency band.

More specifically, a portion of a receiver (the receiver "front end") 100 according to the prior art is depicted in FIG. 1. In this particular example the receiver 100 operates in five frequency bands (Band_1 to Band_5). The receiver 100 includes filtering and impedance matching components 111 and 115 (referred to for simplicity as filters) that are connected to a wideband antenna 105. The filters 111 and 115 are in turn respectively connected to LNAs 121 and 125. The outputs of the LNAs 121 and 125 are in turn connected to image rejection filters 151, 153, . . . 155, respectively, and thence to mixers 131, 133, . . . , 135. Using the mixers 131-135 the signals are mixed down (downconverted) to baseband (e.g., zero Hertz, close to zero Hertz, or to any suitable IF when implementing a super heterodyne or equivalent receiver) for further signal processing. VCOs contained in PLL and calibration circuit blocks 141-145 are connected to mixers 131-135, respectively, and provide appropriate mixing frequency signals thereto. As is apparent from FIG. 1, separate calibration circuitry (part of the PLL and calibration blocks 141-145) is required for servicing the five frequency bands of interest. Note that Band_1 and Band_2 are serviced by the same PLL and calibration block 141 in this non-limiting example of the prior art.

The complexity of the prior art receiver design 100 is further increased by the need for off-chip image rejection filters 151-155. The effective circuit duplication, function overlap and need for chip interconnects to accommodate off-chip filtering processes results in a complex and costly receiver implementation.

SUMMARY OF THE PREFERRED EMBODIMENTS

The foregoing and other problems are overcome, and other advantages are realized, in accordance with the presently preferred embodiments of these teachings.

In one aspect this invention provides a radio frequency receiver for coupling to an antenna. The receiver includes a downconversion mixer, an amplifier having an input coupled to the antenna and an output coupled to a first input of the mixer for providing a received frequency signal to the mixer and a voltage controlled oscillator having an output coupled to a second input of the mixer for providing a mixing frequency signal to the mixer. In the preferred embodiments the components of the amplifier and the voltage controlled oscillator are arranged to exhibit a substantially identical resonant circuit topology and are implemented in the same integrated circuit. The resonant circuit preferably includes tunable elements, such as switchable capacitors and tunable varactors, for component process variation compensation and also for multiple frequency band selection, if desired. In the preferred embodiments the amplifier and the voltage controlled oscillator each include calibration circuitry coupled to a calibration signal for compensating for integrated circuit component value variations, and where a calibration signal used for the voltage controlled oscillator is used as well for the amplifier.

In another aspect this invention provides a method to calibrate a radio frequency receiver. The method includes providing a downconversion mixer, an amplifier having an input coupled to an antenna and an output coupled to a first input of the mixer for providing a received frequency signal to the mixer, and a voltage controlled oscillator having an output coupled to a second input of the mixer for providing a mixing frequency signal to the mixer, where at least components of the amplifier and the voltage controlled oscillator are provided so as to be arranged to exhibit a substantially identical resonant circuit topology in the same integrated circuit. The amplifier and the voltage controlled oscillator are each further provided to comprise calibration circuitry for coupling to a calibration signal for compensating for integrated circuit component value variations. The method further includes obtaining a calibration signal for use in calibrating the voltage controlled oscillator for integrated circuit component value variations, and using the obtained calibration signal for also calibrating the amplifier for integrated circuit component value variations.

In a still further aspect this invention provides a mobile station such as, but not limited to, a cellular telephone that includes at least one antenna and a multimode transceiver operable in different radio frequency bands. The multimode transceiver includes a radio frequency transmitter and a radio frequency receiver coupled to the at least one antenna. The receiver includes a downconversion mixer, an amplifier having an input coupled to the antenna and an output coupled to a first input of the mixer for providing a received frequency signal to the mixer and a tunable oscillator having an output coupled to a second input of the mixer for providing a mixing frequency signal to the mixer. The components of the amplifier and the oscillator are arranged to exhibit a substantially identical resonant circuit topology and are implemented in the same integrated circuit.

In the preferred embodiments of the mobile station the amplifier and the oscillator each include calibration circuitry coupled to a calibration signal for compensating for integrated circuit component value variations, where a calibration signal used for the oscillator is used as well for the amplifier.

BRIEF DESCRIPTION OF THEE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
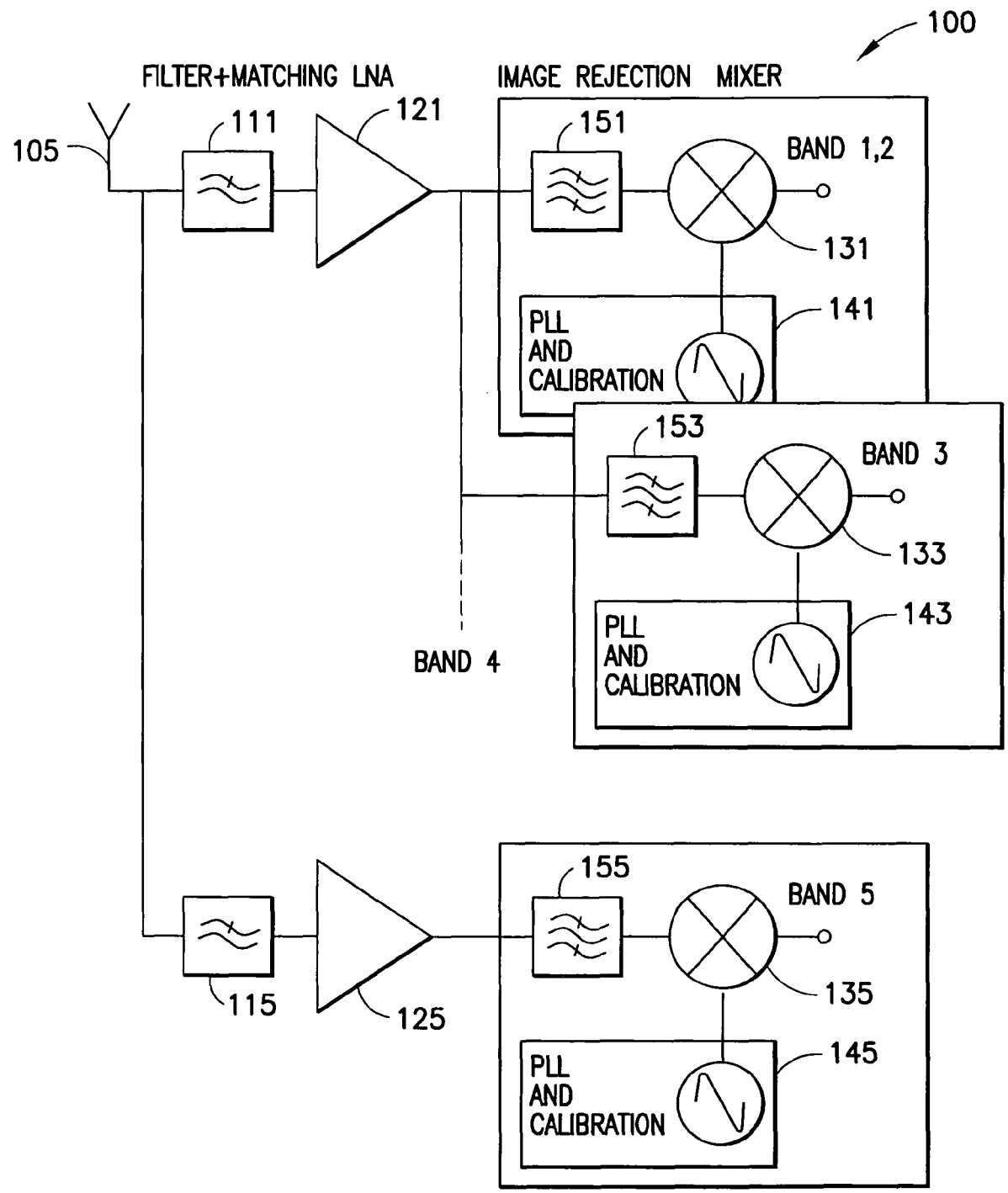
FIG. 1 is a simplified block diagram illustrating an aspect of wireless receiver design made in accordance with the prior art.
Figure 2:
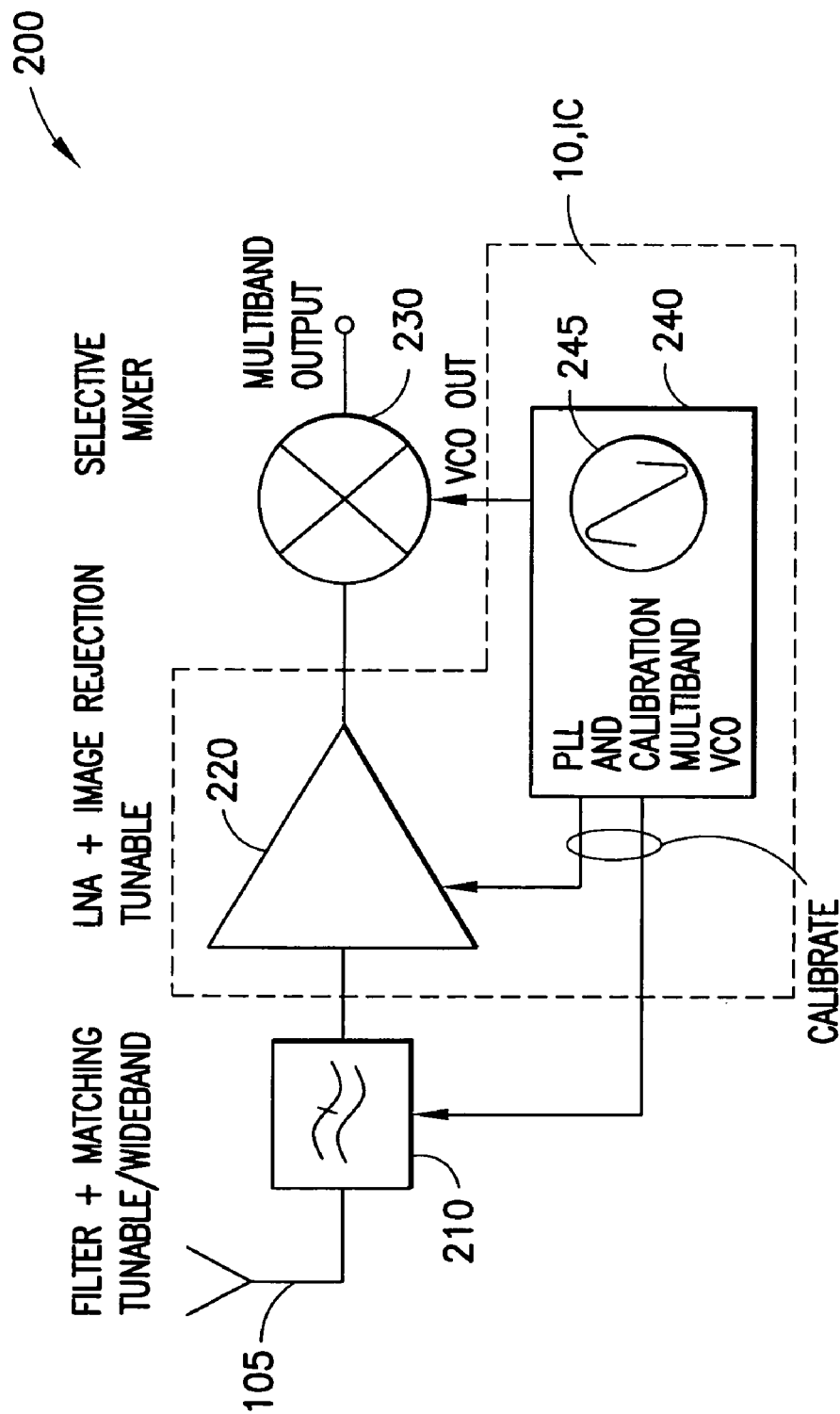
FIG. 2 is a simplified block diagram illustrating an aspect of wireless receiver design made in accordance with a preferred embodiment of the present invention.

A receiver front end 200 constructed in accordance with this invention is depicted in simplified form in FIG. 2. In contrast to the multiple circuits of the prior art receiver front end 100 depicted in FIG. 1, at least LNA 220 and PLL 240/VCO 245 circuit elements are implemented in a common IC (single chip) 10. In addition, in many cases it is also desirable for the mixer 230 to be located on the same chip 10 to ensure adequate gain for the RF signal.

In particular, the output of the off-chip antenna 105 is coupled to a tunable filter 210 that is tunable to the frequency bands of interest. The filter 210 is in turn connected to the input of the LNA 220, and the output of the LNA 220 is in turn connected to the input of a selective mixer 230. Calibration-related outputs of the tunable local oscillator (PLL) 240 are connected to the filter 210 and the LNA 220, and a frequency signal output (VCO_out) is coupled to the mixer 230.

Contrasting FIG. 2 to FIG. 1, it is immediately apparent from FIG. 2 that a feature of this invention is the elimination of multiple redundant circuits that perform the same function for each frequency band of interest. This is accomplished by the implementation of tunable circuit elements in resonant circuits that can be tuned to the desired frequency bands of interest, as well as for use in compensating for component variations. The tuning function is accomplished by associated multiple reactive circuit elements (not depicted in FIG. 2) that are used to tune to the tunable circuit elements to the desired frequency bands.

Since the depicted receiver front end elements 210, 220, 230 and 240 are preferably implemented in a single chip, the circuit components that comprise these individual circuit elements are subject to the same process variations, including the multiple reactive circuit elements used to tune the LNA 220 and the VCO 245. This fact has the desirable effect that the calibration signal developed to calibrate the VCO 245 can likewise be used to calibrate the LNA 220. The availability of a tuning signal for tuning the LNA 220 load and input impedance matching eliminates the need for a separate calibration circuit for the LNA 220. Further, this circuit implementation increases the selectivity of the LNA 220 to such a degree that a separate image signal rejection filter, filters 151-155 depicted in FIG. 1, are rendered unnecessary.

Figures 3, 3A:
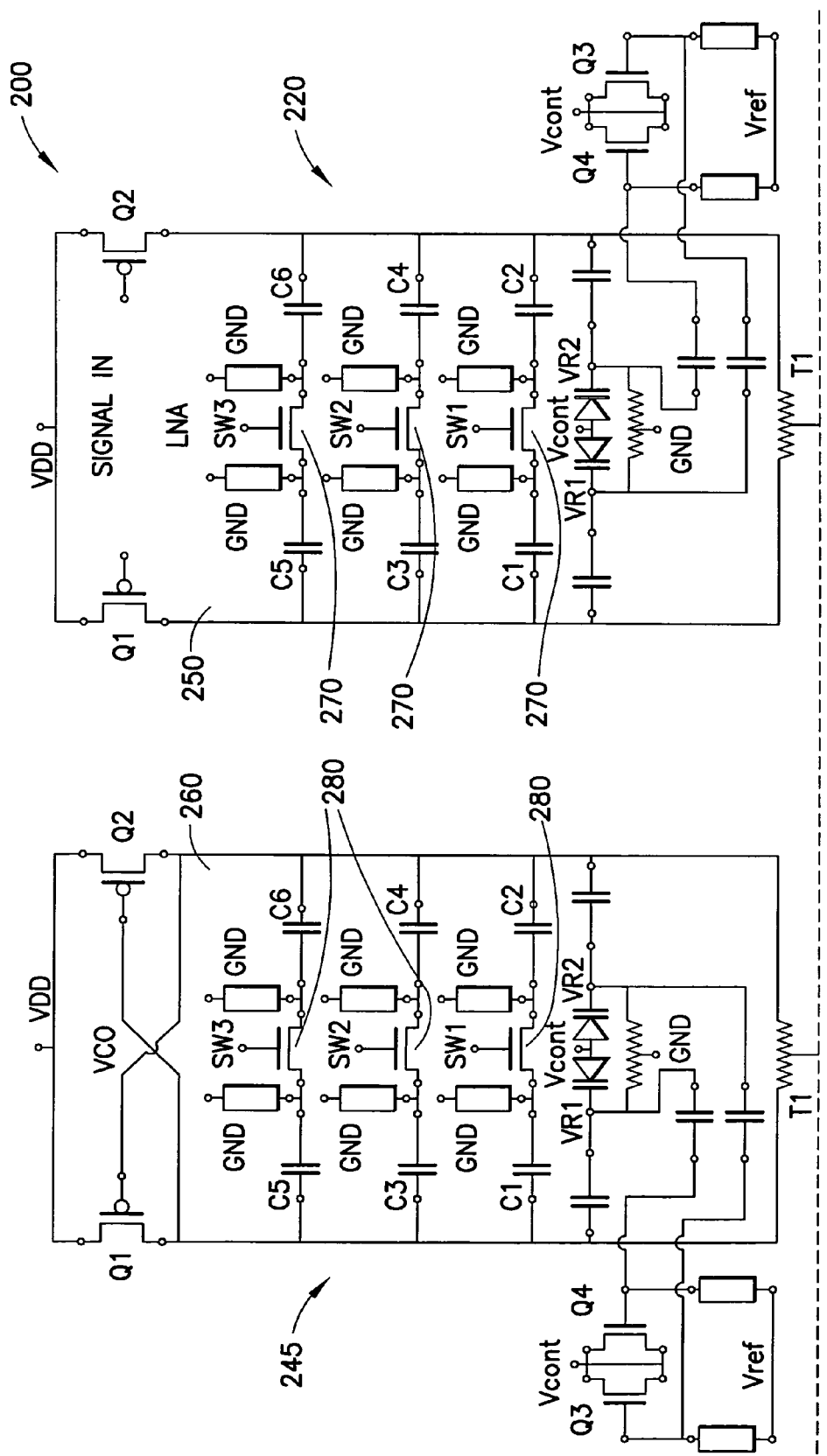
FIG. 3 is a circuit diagram illustrating in greater detail the construction of the LNA, VCO and mixer shown in FIG. 2, and emphasizing the similar resonant circuit topology of the LNA and the VCO.
Figure 3B:
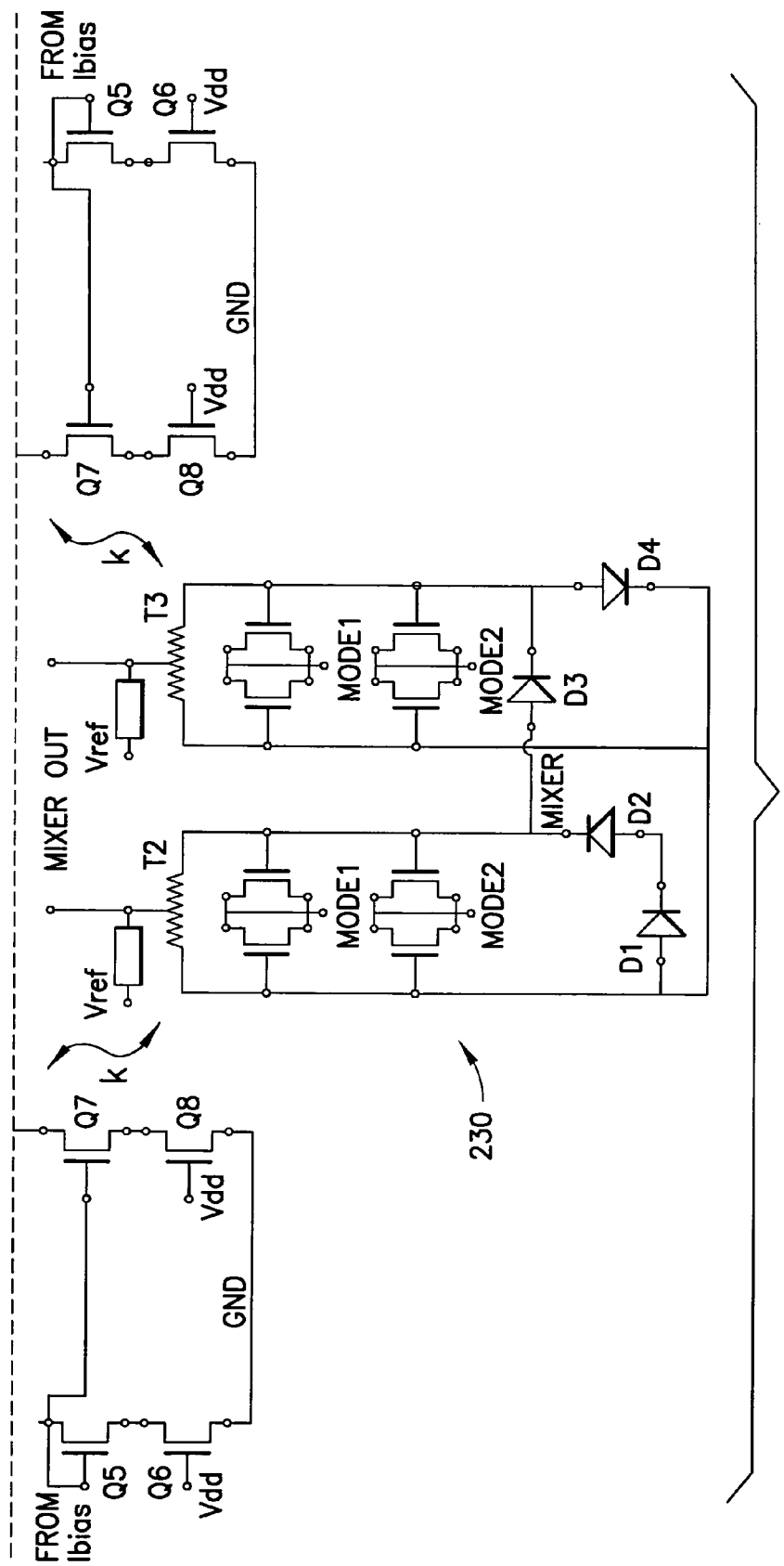

A particular implementation of the receiver front end topology illustrated in FIG. 2 is depicted in FIG. 3. The LNA 220 and VCO 245 are inductively coupled to mixer 230. The LNA 220 and VCO 245 each have associated discrete switched capacitor arrays 250 and 260 that are switched by switches 270 and 280 (capacitors C1-C6 and switches SW1, SW2 and SW3).

A single-chip circuit design that does not rely on external components can require process variation compensation. At frequencies up to several GHz the approximately ±10% variation of capacitance values can cause 300 MHz to 500 MHz variations in the resonance frequency of the VCO 245. To compensate for this variation in operating frequency, a process variation calibration is preferably performed using the capacitors C1-C6 and switches SW1, SW2 and SW3. If the selectivity in the LNA 220 is increased the same type of problem can arise, also requiring calibration to be performed. Furthermore, multi-band operation requires band selection capability for the VCO 245 and the LNA 220 for which the switchable capacitors can also be used.

A desirable feature of this invention is the similarity in the circuit construction and resonance circuit topology of the LNA 220 and the VCO 245, and their implementation in a single IC. A significant distinction between the construction of the LNA 220 and the VCO 245 is that in the VCO 245 the gates of transistors Q1 and Q2 are cross-connected to provide positive feedback to establish an oscillatory condition, whereas the gates of Q1 and Q2 in the LNA 220 form the (differential) signal input nodes of the LNA 220. In other respects, the circuit construction of the LNA 220 and the VCO 245 are substantially identical, including the connections for the current bias (Ibias), voltage reference (Vref) and voltage control (Vcont) signals, and the voltage-tuned varactor diodes VR1, VR2 and various related transistors Q3-Q8. The component values are also preferably substantially identical (within the limits of the IC process variation and differences in small signal gain).

Figure 4:
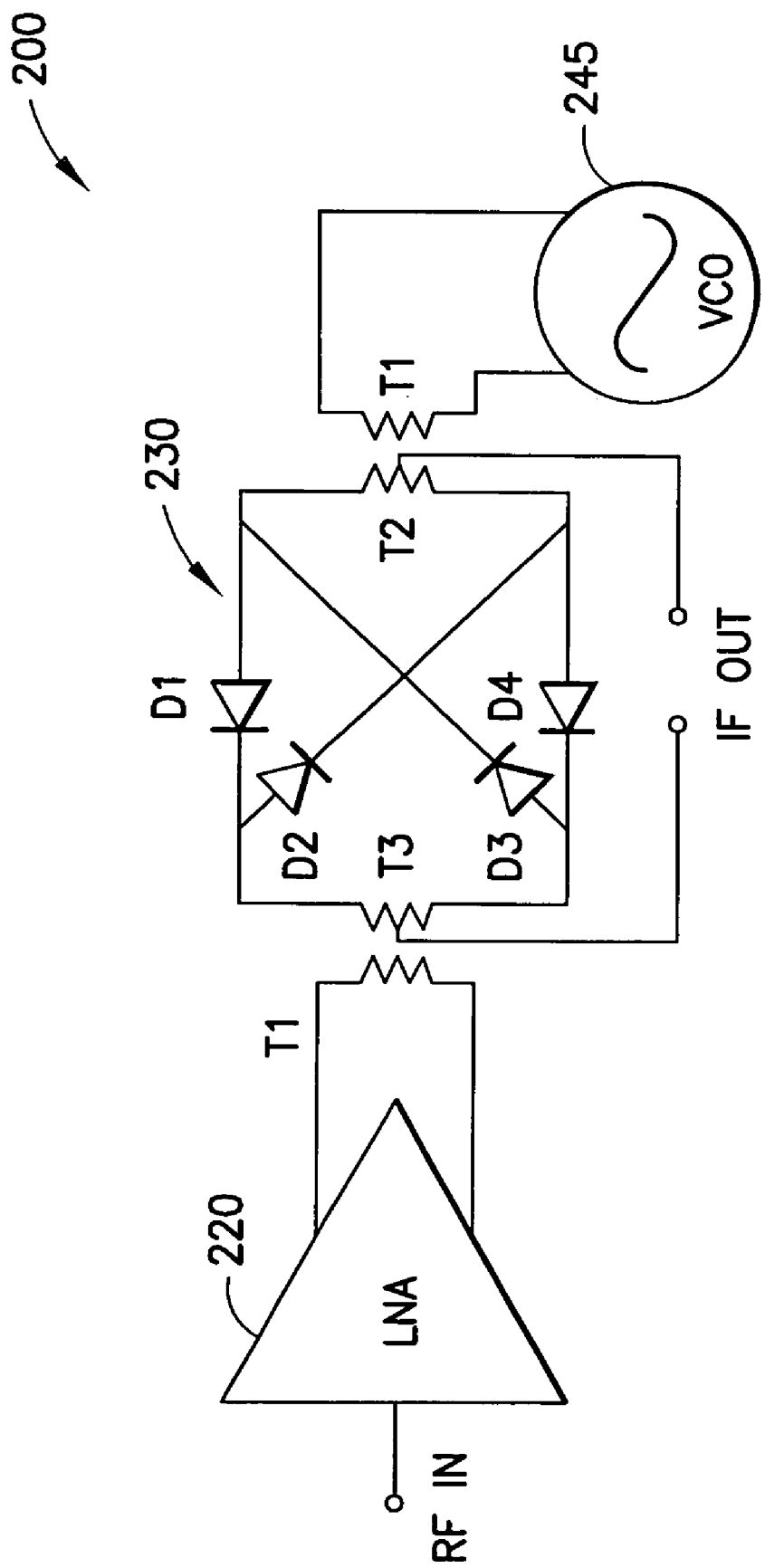
FIG. 4 is a simplified diagram showing the inductive coupling of the mixer, LNA and VCO of FIGS. 2 and 3.

Note further that the output of the LNA 220, and the output of the VCO 245, are both inductively coupled (inductive coupling factor k) via their respective coils T1 to the mixer 230 diode bridge (D1-D4) via mixer coils T2, T3. A simplified diagram of this coupling is shown in FIG. 4. In general, the mixer connections and operational frequency mode selection can be as described in commonly assigned U.S. Pat. No. 6,621,365 B1, "Method and Apparatus Providing a Dual Mode VCO for an Adaptive Receiver", Juha Hallivuori and Pauli Seppinen (incorporated by reference herein in its entirety).

Due to the fact the LNA 220 and the VCO 245 have a substantially identical resonant circuit topology, and are subject to the same process variations by being fabricated in the same IC, it has advantageously been found that the process variation calibration signal determined for the VCO 245 can be used as well to calibrate the LNA 220. This calibration signal can be determined in various ways. One suitable and preferred technique is described by Kalle Asikainen and Pauli Seppinen in commonly assigned U.S. Pat. No. 6,639,474, entitled "Adjustable Oscillator", incorporated by reference herein in its entirety. For example, in this approach an adjustable oscillator has at least one resonant circuit and the frequency of the oscillator is adjusted by changing the resonant frequency of the at least one resonant circuit by means of a control signal. With regard to the control signal, a minimum value and a maximum value are selected, as is at least one target value. The frequency of the adjustable oscillator is set to substantially correspond to the target value. The value of the control signal and the target value are compared, and when the value of the control signal is substantially different from the target value, a tuning signal is produced to change the resonant frequency of the at least one resonance circuit.

As should be apparent, the VCO 245 can be calibrated when the LNA 220 is still uncalibrated, as the preferred (but non-limiting) approach does not require an RF input signal.

In general, the calibration signal can control SW1-SW3 for selecting C1-C6 for both calibration and band selection. Suitable component values for the capacitors and inductors are a function of the actual application. However, it can be noted in this regard that integrated circuit 10 coil values, assuming a good Q value, are approximately in the range of about 0.5 nH to about 6 nH, and the resonant frequency ($f_o$) is defined as the reciprocal of two pi times the square root of the inductance (L) multiplied by the capacitance (C).

If the value of L is fixed, then the variation in frequency arises from the achievable variation of the value of C. Thus, component values for L and C can be quite restricted. If the value of L is variable or tunable, as in the above-referenced commonly assigned U.S. Pat. No. 6,621,365 B1, "Method and Apparatus Providing a Dual Mode VCO for an Adaptive Receiver", Juha Hallivuori and Pauli Seppinen, it becomes possible to provide more frequency bands over a wider frequency range with one receiver front end.

Figure 5:
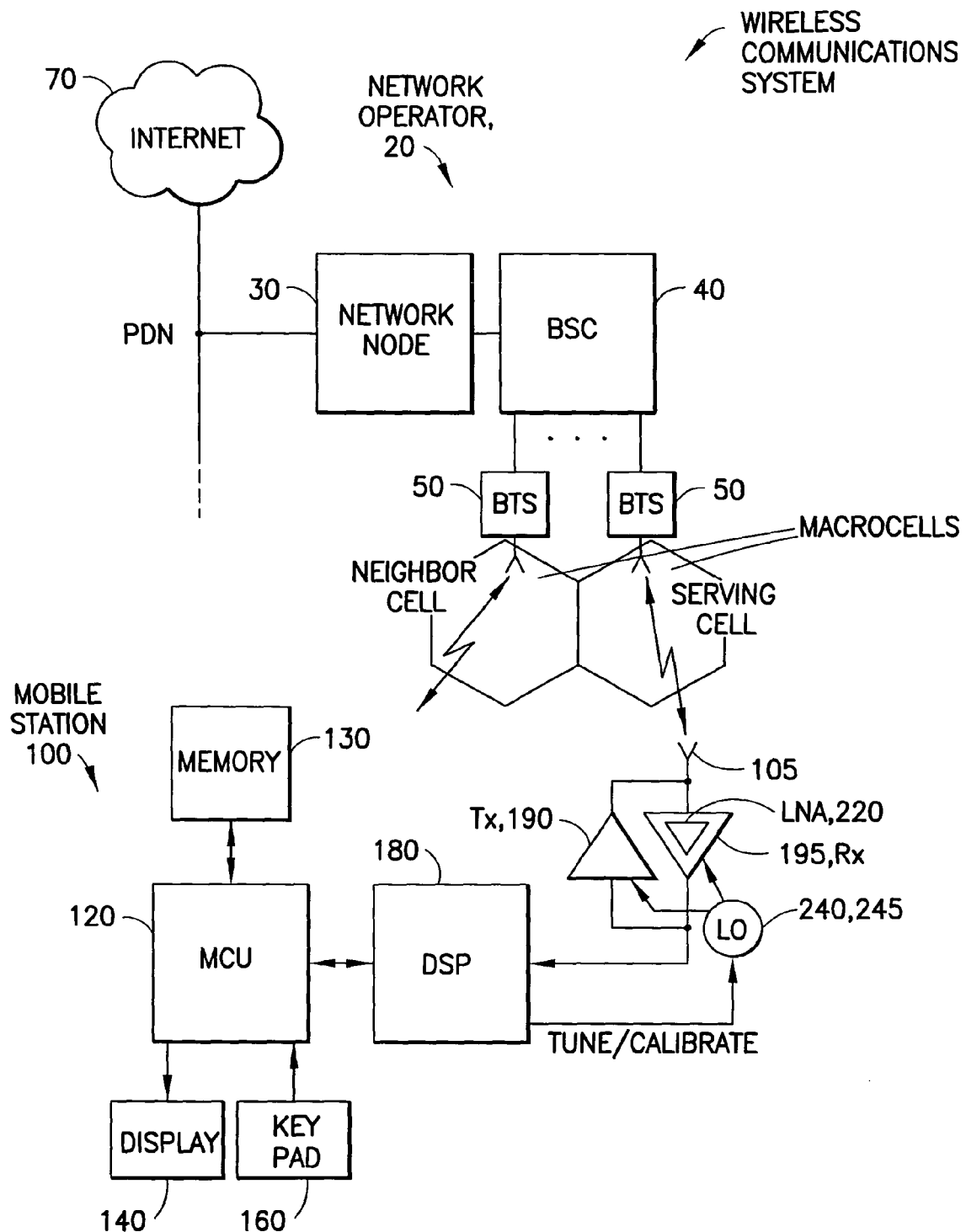
FIG. 5 is a block diagram of a wireless communications system that includes a mobile station having an RF front end constructed and operated in accordance with this invention.

In order to place this invention into a suitable technological context, reference is made to FIG. 5 where there is illustrated a simplified block diagram of an embodiment of a wireless communications system that includes at least one mobile terminal or mobile station (MS) 100 that is suitable for practicing this invention. An exemplary network operator is also shown having, for example, a network node 30 for connecting to a data communications network, such as a Packet Data Network or PDN, at least one base station controller (BSC) 40, and a plurality of base receiver stations (BTS) 50 that transmit in a forward or downlink direction both physical and logical channels to the mobile station 100 in accordance with a predetermined air interface standard. Each BTS 50 is assumed to support a cell. A reverse or uplink communication path also exists from the mobile station 100 to the network operator, which conveys mobile originated access requests and traffic.

The air interface standard can conform to any suitable standard or protocol, and may enable both voice and data traffic, such as data traffic enabling Internet 70 access and web page downloads. One suitable type of air interface is based on TDMA and may support a GSM or an advanced GSM protocol, although these teachings are not intended to be limited to TDMA or to GSM or GSM-related wireless systems. In fact, another wireless system and air interface, such as a WCDMA system, may serve at least a part of the geographical area served by the wireless communication system shown in FIG. 5, and the MS 100 is then in a preferred embodiment a multi-band terminal that is capable of operating with either the GSM or the WCDMA network. Alternatively, it may a single-band terminal that operates only with the WCDMA system.

The mobile station 100 typically includes a microcontrol unit (MCU) 120 having an output coupled to an input of a display 140 and an input coupled to an output of a keyboard or keypad 160. The mobile station 100 may be a handheld radio telephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user. The MS 100 could also embody, as non-limiting examples, a PDA, or a gaming device, or an Internet appliance having wireless communications capabilities.

The MCU 120 is assumed to include or be coupled to some type of a memory 130, including a read-only memory (ROM) for storing an operating program, as well as a random access memory (RAM) for temporarily storing required data, scratchpad memory, received data, data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocols required to operate in the wireless communications system, as well as to provide a suitable user interface (UI), via display 140 and keypad 160, with a user. The stored program also is operable for executing a suitable joint calibration procedure for the LNA 220 and the VCO 245. Although not shown, a microphone and speaker can be provided for enabling the user to conduct voice calls in a conventional manner.

The mobile station 100 also contains a wireless section that includes a digital signal processor (DSP) 180, or equivalent high speed processor or logic or control unit, as well as a wireless transceiver that includes a transmitter (Tx) 190 and a receiver (Rx) 195 (that contains the LNA 220), both of which are coupled to the antenna 105 for communication with the network operator via the BTS 50. At least one local oscillator (LO), that includes the PLL 240 having the VCO 245, is provided for tuning the transceiver. Data, such as digitized voice and packet data, is transmitted and received through the antenna 105.

While this invention may be used in the 1.9 GHz and 2.1 GHZ WCDMA and the 900/1800 MHz GSM bands, the teachings of this invention are not restricted for use in any particular frequency band or bands. This invention is also not restricted to use in any specific type of wireless architecture, and could be used in, for example, architectures that feature direct conversion receivers as well as super heterodyne receivers.

In the presently preferred mobile station 100 embodiment of this invention the receiver 195 is tunable and operates over a plurality of frequency bands of interest, where a frequency band of interest may include a CDMA frequency band or a TDMA frequency band. More generally, the frequency band of interest may include any preferred frequency band including, but not limited to, the GSM, WCDMA, UWB (e.g., 3.1 Ghz and 4.8 GHz), WLAN (e.g., 2.4 GHz and 5 GHz), Bluetooth (2.4 GHz), DVB-H (e.g., UHF, 470-838 MHz), GPS, FM and RF-ID (e.g., 868 MHz) frequency bands.

Based on the foregoing it can be appreciated that embodiments of this invention concern a receiver design implemented on a single chip and that can include a tunable, wideband filter coupled to a receiver antenna. The tunable wideband filter is in turn coupled to the LNA 220, and the output of the LNA 220 is coupled to the frequency selective mixer 230. Frequency selectivity is achieved by changing the LNA 220 and VCO 245 loads, thus changing the mixer 230 input resonances. A PLL 240 includes a multiband voltage controlled oscillator 245 that is coupled to the mixer 230. Since the VCO 245 and LNA 220 have associated resonant circuits implemented in a single chip, they are subject to the same process variations. In the preferred embodiments of the invention the components of the LNA 220 and the VCO 245 are arranged to exhibit a substantially identical resonant circuit topology, and as a result the same integrated circuit calibration signal used to calibrate the VCO 245 can likewise be coupled to the LNA 220 for calibration purposes. One advantageous consequence of this preferred design is that the selectivity of the LNA 220 can be substantially increased, eliminating the need for the separate, off-chip image rejection filter 151 of the prior art.

The present invention overcomes the limitations of the prior art by providing a one-chip receiver design that eliminates the need for multiple off-chip filters and, in particular, an off-chip image rejection filter for rejecting unwanted image signals. In the preferred embodiments the LNA 220 and VCO 245 are fabricated in a single chip over a common semiconductor substrate, and the LNA 220 and VCO 245 have substantially identical resonant circuits that are subject to the same chip fabrication process variations. Since the LNA 220 can be coupled to the VCO 245 for calibration purposes the need for separate LNA calibration circuitry can be avoided.

In the preferred embodiments of this invention the LNA 220 and the VCO 245 each comprise calibration/band selection circuitry that is coupled to a band selection signal for performing band selection in the multi-band receiver front end, and the same band selection signal is preferably used for the VCO 245 and for the LNA 220. In the preferred embodiments of this invention the calibration signal and band selection signal are the same signal, since the calibration is performed for a certain frequency which can be selected according to the band of interest. In this manner the calibration performed for the process variations, and the band selection, can be accomplished at the same time. The calibration/band selection circuitry may comprise a tunable inductor.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent one-chip front end receiver designs may be attempted by those skilled in the art, as may specific circuit architectures that deviate form the one shown in FIG. 3. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. An apparatus, comprising:
a mixer;
an amplifier configured to provide a received frequency signal to the mixer; and
an oscillator configured to provide a mixing frequency signal to the mixer, where components of the amplifier and the oscillator are arranged to exhibit an at least partially identical resonant circuit topology and are implemented in a same integrated circuit.

2. The apparatus as in claim 1, where the amplifier and the oscillator each comprises calibration and band selection circuitry configured to receive a signal for compensating for integrated circuit component value variations.

3. The apparatus as in claim 1, wherein the amplifier and the oscillator each are configured to receive a signal for compensating for integrated circuit component value variations of their respective components.

4. The apparatus as in claim 1, wherein the amplifier is configured to receive the signal from an output of the oscillator to compensate for integrated circuit component value variations.

5. The apparatus as in claim 4, wherein the oscillator has another output configured to provide a calibration signal to a filter which is electrically connected to the amplifier.

6. The apparatus as in claim 1, where the oscillator and the amplifier are configured to be calibrated by a same calibration signal.

7. An apparatus comprising:
a mixer;
an amplifier configured to provide a received frequency signal to the mixer; and
an oscillator configured to provide a mixing frequency signal to the mixer, wherein the amplifier and the oscillator have resonant circuit topologies identical at least in part.

8. An apparatus as in claim 7, wherein the amplifier and oscillator are implemented in a same integrated circuit.

9. An apparatus as in claim 7, wherein the oscillator and the amplifier are configured to be calibrated by a same calibration signal.

10. An apparatus as in claim 9, wherein the apparatus is configured to be tuned to operate over a plurality of frequency bands of interest by using the calibration signal.

11. An apparatus as in claim 7, wherein both the amplifier and the oscillator are inductively coupled to the mixer.

12. An apparatus as in claim 7, wherein each of the oscillator and the amplifier comprises an array of switched capacitances.

13. An apparatus as in claim 7, wherein each of the oscillator and the amplifier comprises a tunable inductance.

14. An apparatus as in claim 7, further comprising an antenna.

15. An apparatus as in claim 7, further comprising a filter electrically connected to the amplifier.

16. An apparatus as in claim 15, further comprising an interconnection from the oscillator to the filter for tuning the filter to a frequency band.

17. An apparatus as in claim 16, further comprising an interconnection from the oscillator to the amplifier for calibrating the amplifier.

18. An apparatus as in claim 7, wherein the amplifier is a low noise amplifier and the oscillator is a voltage controlled oscillator.

19. The apparatus as in claim 7, wherein the apparatus comprises a radio frequency receiver.

20. The apparatus as in claim 7, wherein the apparatus comprises a mobile station.

21. The apparatus as in claim 7, wherein the apparatus comprises a single amplifier, a single oscillator, and a single mixer.

22. The apparatus as in claim 7, wherein the oscillator is configured to have its frequency adjusted by a control signal.

23. The apparatus as in claim 22, wherein the control signal has selectable minimum and maximum values.

24. The apparatus as in claim 7, wherein the apparatus is configured to select a frequency band of operation by a calibration signal.

25. A method comprising:
receiving a signal;
amplifying the signal by an amplifier;
generating a mixing frequency from an oscillator having a substantially identical resonant circuit topology to that of the amplifier; and
mixing the mixing frequency and the amplified signal at a mixer to provide a down converted signal.

26. A method as in claim 25, further comprising applying a same calibration signal to both the oscillator and the amplifier.

27. A method as in claim 25, further comprising filtering unwanted image frequencies without providing a tunable filter electrically connected to the amplifier between the output of the amplifier and an input of the mixer.

28. A computer readable storage having instructions directed to applying a calibration signal, that when executed by a computer result in operations comprising:
operating an apparatus in a wireless communication system, the apparatus comprising an oscillator and an amplifier, where components of the amplifier and the oscillator are arranged to exhibit an at least partially identical resonant circuit topology; and
applying a calibration signal to both the oscillator and the amplifier which provide signals to a mixer in the apparatus.

29. An integrated circuit comprising:
an amplifier configured to provide an amplified received frequency signal to a mixer; and
an oscillator configured to provide a mixing frequency signal to the mixer, wherein the amplifier and the oscillator have a mostly identical resonant circuit topology.

30. An integrated circuit as in claim 29, further comprising the mixer configured to mix the amplified received frequency signal and the mixing frequency signal.

31. An integrated circuit as in claim 29, wherein the amplifier and the oscillator differ in gate connections of a pair of corresponding transistor pairs from each of the amplifier and the oscillator, wherein gates of a transistor pair of the oscillator are cross-connected to provide positive feedback to establish an oscillatory condition and gates of a corresponding transistor pair of the amplifier provide differential signal input nodes of the amplifier.

32. An integrated circuit according to claim 29, further comprising at least one component of a front end of a receiver.

33. An integrated circuit according to claim 29, further comprising a filter arranged to provide an input to the amplifier.

34. An integrated circuit according to claim 33, wherein an antenna is configured to electrically interconnect to an input of the filter to provide a path to receive a signal.

35. An integrated circuit according to claim 29, further comprising a wideband, tunable filter electrically interconnected to the amplifier.

36. An integrated circuit according to claim 29, wherein an operational frequency for the amplifier and the oscillator is selectable from a plurality of resonant frequencies.

37. An integrated circuit according to claim 29, wherein the oscillator is configured to be calibrated while the amplifier remains uncalibrated.

38. An apparatus comprising:
means for receiving a signal;
means for amplifying the signal;
means for generating a mixing frequency; and
means for mixing the mixing frequency and the amplified signal to provide a down converted signal, wherein the means for amplifying and the means for generating a mixing frequency have a similar circuit construction and a substantially identical resonant circuit topology.

39. The apparatus as in claim 38, wherein the apparatus is implemented on a single integrated circuit chip.

40. An apparatus comprising:
a plurality of resonant circuit structures having a substantially identical resonant circuit topology fabricated on a same integrated circuit;
wherein a first of the plurality of resonant circuit structures is configured to receive an input signal and provide an output signal representing an amplification of the input signal to a mixer;
wherein a second of the plurality of resonant circuit structures is configured to generate an oscillator signal and provide it to a mixer,
wherein each of the plurality of resonant circuit structures is configured to be calibrated by a calibration signal.

41. The apparatus as in claim 40, further comprising the mixer configured to receive both the output signal and the oscillator signal and configured to output a down converted signal.

42. The apparatus as in claim 41, further comprising a filter.

43. The apparatus as in claim 42, wherein the filter is electrically connected to the first of the plurality of resonant circuit structures.

44. The apparatus as in claim 43, wherein the filter is configured to provide an input signal to the first resonant circuit structure.

45. The apparatus as in claim 43, wherein the filter and the mixer are fabricated on the same integrated circuit.

46. The apparatus as in claim 40, wherein each of the plurality of resonant circuit structures is configured to be calibrated by a same calibration signal.

47. The apparatus as in claim 42, wherein the filter is configured to provide impedance matching.

48. An apparatus comprising:
a first resonant circuit structure;
a second resonant circuit structure having at least a mostly identical resonant circuit topology to that of the first resonant circuit structure; and a mixer, wherein the first resonant structure provides a first signal to the mixer and the second resonant structure provides a second signal to the mixer, wherein both the first resonant circuit structure and the second resonant circuit structure are configured to be calibrated by a calibration signal.

49. The apparatus as in claim 48, wherein the first and second resonant circuit structures are configured to be calibrated by the same calibration signal.

50. The apparatus as in claim 48, wherein the second resonant circuit structure is configured to provide the calibration signal to the first resonant circuit structure.

51. The apparatus as in claim 48, wherein the second resonant circuit structure has a substantially identical resonant circuit topology to that of the first resonant circuit structure.

52. The apparatus as in claim 51, wherein the first and second resonant circuit structures comprise substantially identical arrays of switched capacitances, a substantially identical transistor circuit construction, substantially identical circuit connections, and substantially identical component values.

53. The apparatus as in claim 52, where gates of a transistor pair in the second resonant circuit structure are cross-connected to provide positive feedback to establish an oscillatory condition and gates of a corresponding transistor pair in the first resonant circuit structure form different signal input nodes of an amplifier.

54. The apparatus as in claim 48, wherein the first and second resonant circuit structures have very similar circuit construction.

55. The apparatus as in claim 48, wherein the first and second resonant circuit structures have substantially identical circuit construction.

56. A method comprising:
modifying a first signal by a first resonant circuit structure;
providing a second signal by a second resonant circuit structure, the second resonant circuit structure having a very similar resonant circuit topology to that of the first resonant circuit structure; and
mixing the modified first signal and the second signal to generate a third signal.

57. The method of claim 56, wherein the modified first signal is a filtered signal.

58. The method of claim 56, wherein the modified first signal is an amplified signal.

59. The method of claim 56, wherein the second signal is an oscillator signal.

60. The method of claim 56, further comprising calibrating the first and second resonant circuit structures by a calibration signal.

61. The method of claim 56, further comprising calibrating the first and second resonant circuit structures by a same calibration signal.

62. The method of claim 56, further comprising calibrating the second resonant circuit structure while the first resonant circuit structure is uncalibrated.

63. The method of claim 62, further comprising calibrating the first resonant circuit structure by a signal from the second resonant circuit structure.

64. The method of claim 63, wherein the modified first signal is a filtered amplified signal and the second signal is an oscillator signal.

65. An apparatus comprising:
a computer readable medium embodied with computer executable instructions to perform operations comprising controlling a calibration procedure to apply a calibration signal to first and second resonant circuit structures wherein the first and second resonant circuit structures each apply a signal to a mixer and wherein the first resonant circuit structure has a resonant circuit topology at least mostly identical to that of the second resonant circuit structure.

66. The apparatus of claim 65, wherein the same calibration signal is provided to the first and second resonant circuit structures.

67. The apparatus of claim 65, wherein the calibration signal is applied to the second resonant circuit structure while the first resonant circuit structure remains uncalibrated.

68. A memory comprising:
hardware configured to store computer executable instructions to perform operations comprising controlling a calibration procedure to apply a calibration signal to first and second resonant circuit structures wherein the first and second resonant circuit structures each apply a signal to a mixer and wherein the first resonant circuit structure has a resonant circuit topology very similar to that of the second resonant circuit structure.

* * * * *